(12) United States Patent
Lau et al.

(10) Patent No.: US 9,661,392 B2
(45) Date of Patent: May 23, 2017

(54) SYSTEMS AND METHODS FOR USING AN INTERACTIVE MEDIA GUIDANCE APPLICATION ON MOBILE USER EQUIPMENT

(71) Applicant: Rovi Guides, Inc., Santa Clara, CA (US)

(72) Inventors: Erwin Lau, Tsuen Wan (HK); Neel S. Ketkar, Santa Monica, CA (US); Richard P. Cusick, Los Angeles, CA (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/635,791

(22) Filed: Mar. 2, 2015

(65) Prior Publication Data

US 2015/0201245 A1 Jul. 16, 2015

Related U.S. Application Data

(63) Continuation of application No. 11/391,958, filed on Mar. 28, 2006, now abandoned.

(60) Provisional application No. 60/667,265, filed on Mar. 31, 2005.

(51) Int. Cl.
| | |
|---|---|
| *G06F 3/00* | (2006.01) |
| *G06F 13/00* | (2006.01) |
| *H04N 5/445* | (2011.01) |
| *H04N 21/482* | (2011.01) |
| *H04W 4/02* | (2009.01) |
| *H04N 21/414* | (2011.01) |

(52) U.S. Cl.
CPC ..... *H04N 21/482* (2013.01); *H04N 21/41407* (2013.01); *H04W 4/02* (2013.01)

(58) Field of Classification Search
CPC .................. H04N 21/482; H04N 21/41407
See application file for complete search history.

(56) References Cited

U.S. PATENT DOCUMENTS

| | | | | |
|---|---|---|---|---|
| 2002/0150387 A1* | 10/2002 | Kunii | ...................... | H04H 60/09 386/297 |
| 2002/0174430 A1* | 11/2002 | Ellis | ...................... | G11B 27/005 725/46 |
| 2003/0208767 A1* | 11/2003 | Williamson | .......... | G06F 3/0482 725/93 |
| 2005/0122435 A1* | 6/2005 | Yunoki | .................. | H04N 5/782 348/725 |

OTHER PUBLICATIONS

U.S. Appl. No. 11/391,958, filed Mar. 28, 2006, Lau et al.

* cited by examiner

*Primary Examiner* — Imran Mustafa
(74) *Attorney, Agent, or Firm* — Ropes & Gray LLP

(57) ABSTRACT

An interactive media guidance application implemented on mobile user equipment may utilize location-based services to retrieve program listings information based on a user's present location. The program listings may be retrieved in response to detecting a change in the user's location or detecting a change in the program listings information.

20 Claims, 11 Drawing Sheets

SYSTEMS AND METHODS FOR USING AN INTERACTIVE MEDIA GUIDANCE APPLICATION ON MOBILE USER EQUIPMENT

CROSS REFERENCE TO RELATED APPLICATION

This application is a continuation of U.S. patent application Ser. No. 11/391,958, filed Mar. 28, 2006, which is currently pending, and claims the benefit of U.S. provisional patent application No. 60/667,265, filed Mar. 31, 2005, which are hereby incorporated by reference herein in their entireties.

BACKGROUND OF THE INVENTION

This application relates to interactive media guidance applications and more particularly to interactive media guidance applications implemented on mobile user equipment.

An interactive media guidance application implemented on mobile user equipment allows a user to access media information from any location where the mobile user equipment is in communication with a network.

Recent advances in mobile technology have resulted in the emergence of location-based services that can determine a user's location using technologies such as, for example, global positioning system (GPS) triangulation, or radio-frequency (RF) multipath fingerprinting. An example of a location-based service that is becoming more common in mobile phones is the ability to locate an individual who has dialed an emergency number (e.g., 9-1-1).

Media information, such as, for example television program listings may be region specific and the user may wish to obtain media information for the user's current location. It may be desirable to use location-based services to allow an interactive media guidance application to retrieve and display media information based on the user's current location.

SUMMARY OF THE INVENTION

An interactive media guidance application may be implemented on mobile user equipment that is capable of performing location-based services. In some embodiments, the mobile user equipment may include a GPS sensor that communicates with one or more GPS satellites to pinpoint the user's current location. In some embodiments, the mobile user equipment may request that the network to which it is connected perform network-based techniques such as triangulation, RP multipath fingerprinting, or any other suitable technique to determine the user's current location.

In response to determining the user's current location, the interactive media guidance application may send a request to a media database to obtain media information for the user's current location. For the purposes of simplification and not limitation, the media database will be discussed herein primarily as a program listings database that provides program listings information, although any other suitable media database or combination of media databases may be used.

As part of the request, the interactive media guidance application may provide the program listings database with the user's current location in any suitable format that is accepted by the program listings database (e.g., ZIP code, city and state, area code, etc.). The program listings database may respond by transmitting program listings information for the specified location to the interactive media guidance application, which may than be displayed by the interactive media guidance application.

The interactive media guidance application may continue to update the program listings information at periodic intervals. Alternatively, the user may manually initiate an update of program listings information.

Further features of the invention, its nature and various advantages will be more apparent from the accompanying drawings and the following detailed description of the preferred embodiments.

DETAILED DESCRIPTION OF THE PREFERRED EMBODIMENTS

The amount of media available to users in any given media delivery system can foe substantial. Consequently, many users desire a form of media guidance, an interface that allows users to efficiently navigate media selections and easily identify media that they may desire. An application that provides such guidance is referred to herein as an interactive media guidance application or, sometimes, a guidance application.

Interactive media guidance applications may take various forms depending on the media for which they provide guidance. One typical type of media guidance application is an interactive television program guide. Interactive television program guides are well-known, guidance applications that, among other things, allow users to navigate among and locate television programming viewing choices and, in some systems, digital music choices. The television programming (and music programming) may be provided via traditional broadcast cable, satellite, Internet, or any other means. The programming may be provided on a subscription basis (sometimes referred to as premium programming), as pay-per-view programs, or on-demand such as in video-on-demand (VOD) systems.

With the advent of the internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as online applications (i.e., provided on a web-site), or as stand-alone applications or clients on user equipment devices, such as, for example, hand-held computers, personal digital assistants (PDAs), cellular telephones, or traditionally-passive devices that have been enhanced with circuitry for operating interactive media guidance applications (e.g., wrist watches, telephone hand sets, appliances, etc.). In some systems, users may control equipment remotely via a media guidance application. For example, users may access an online media guide and set recordings or other settings on their in home equipment. This may be accomplished by the online guide controlling the user's equipment directly or via another media, guide that runs on the user's equipment. Remote access of interactive media guidance applications is discussed in greater detail in Bills et al. U.S. Patent Publication No. 2005/0028208-A1, which is hereby incorporated by reference herein: in its entirety.

Figure 1:
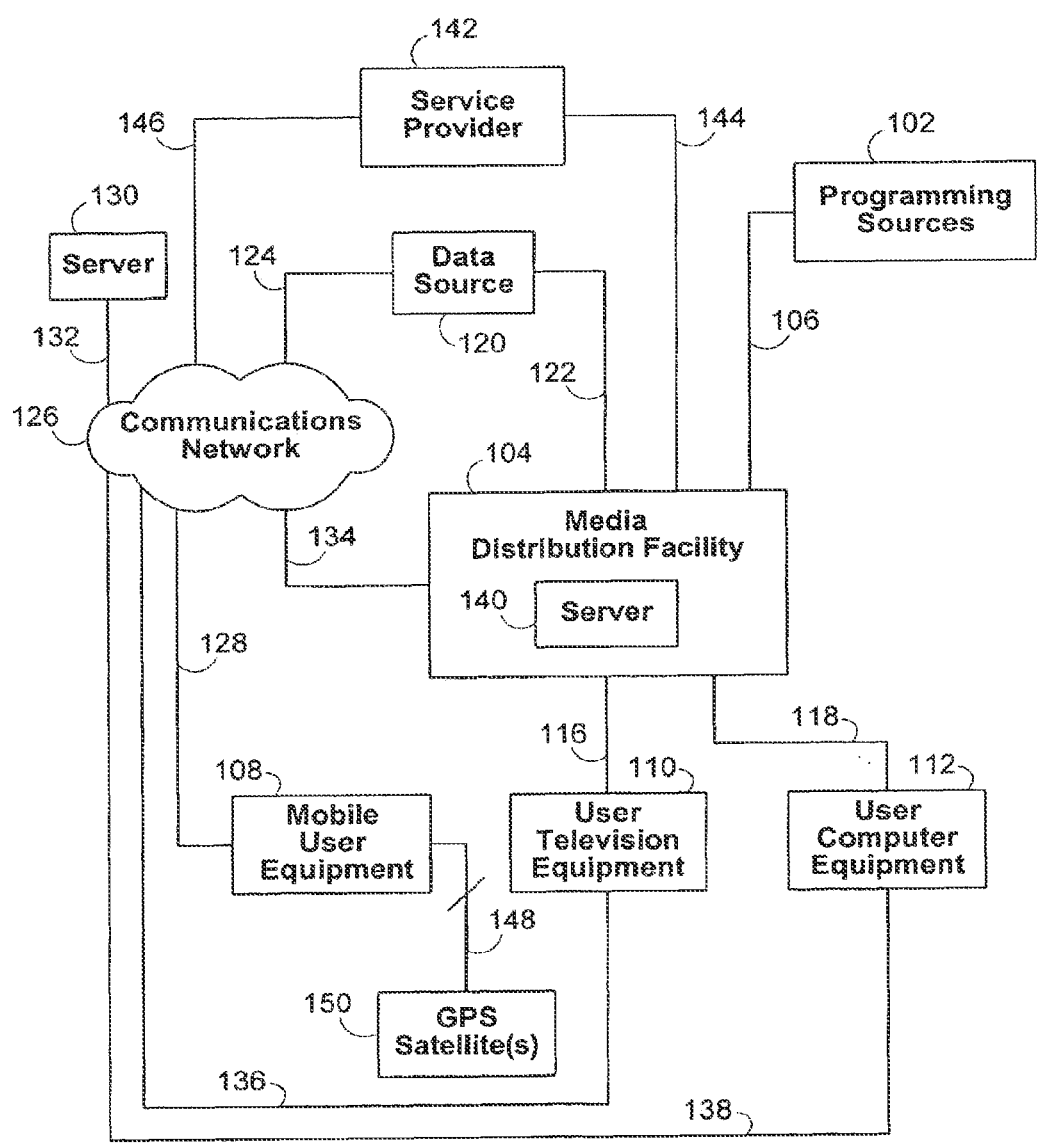
FIG. 1 is a diagram of an illustrative interactive media guidance system in accordance with the present invention.

An illustrative interactive media guidance system 100 in accordance with the present invention is shown in FIG. 1. System 100 is intended to illustrate a number of approaches by which media of various types, and guidance for such media, may be provided to (and accessed by) end-users. The present invention, however, may be applied in systems employing any one or a subset of these approaches, or in systems employing other approaches for delivering media and providing media guidance.

System 100 may include any one or more of mobile user equipment 108, user television equipment 110, and user computer equipment 112. Mobile user equipment 108 may be any suitable mobile device including, for example, a cellular phone, a personal digital assistant (PDA), a laptop computer, a handheld computer, a mobile media player, a wireless e-mail device, and a vehicle-based media system. In some embodiments, mobile user equipment 108 may include a GPS sensor that communicates with a plurality of GPS satellites 150 to determine the location of mobile user equipment 108. An illustrative embodiment of mobile user equipment 108 is discussed below in greater detail in connection with FIG. 2.

User television equipment 110 may include, for example, a television and any one or more of a set-top box and a recording device. User computer equipment 112 may be any suitable computing device including for example, a desktop computer, laptop computer, and handheld computer. Illustrative embodiments of user television equipment 110 and user computer equipment 112 (FIG. 1) are discussed in greater detail in Thomas et al. U.S. Patent Application Publication No. 2005/0120373 A1, which is hereby incorporated by reference herein in its entirety.

The first approach represents a typical television-centric system in which users may access media (e.g., television programming and/or digital audio). This includes programming sources 102 and distribution facility 104. Media is provided from programming sources 102 to distribution facility 104, using communications path 106. Communications path 106 may be a satellite path, a fiber-optic path, a cable path, or any other suitable wired or wireless communications path or combination of such paths.

Programming sources 102 may be any suitable sources of television and music programming, such as television broadcasters (e.g., NBC, ABC, and HBO) or other television or music production studios. Programming sources 102 may provide television programming in a variety of formats in high definition and standard definition, such as, for example, 1080p, 1080i, 720p, 480p, 480i, and any other suitable format. There are typically numerous programming sources 102 in system 100, but only one is shown in FIG. 1 to avoid overcomplicating the drawing.

Distribution facility 104 may be a cable system headend, a satellite distribution facility, a television broadcaster, or any other suitable facility for distributing video media (e.g., television, programs, video-on-demand programs, pay-per-view programs) and audio media (e.g., music programming and music clips) to the equipment of subscribers of the corresponding cable, satellite, or Internet protocol television (IPTV) system. In some approaches, distribution facility 104 may also distribute other media to users, such as video and audio clips, web pages, and interactive applications, that may be offered to subscribers of a given cable, satellite, or IPTV system. There are typically numerous distribution facilities 104 in system 100, but only one is shown in FIG. 1 to avoid overcomplicating the drawing.

Distribution facility 104 may be connected to user television equipment 110 and user computer equipment 112.

User equipment devices 110 and 112 may receive media (such as television programs, music, web pages, etc.) and other data from distribution facility 104 over communications paths, such as communications paths 116 and 118, respectively. User equipment devices 110 and 112 may also transmit signals to distribution facility 104 over paths 116 and 118, respectively. Paths 116 and 118 may be cables or other wired connections, free-space connections (e.g., for broadcast or other wireless signals), satellite links, or any other suitable link or combination of links.

A second approach illustrated in FIG. 1 by which media and media guidance axe provided to end users is a non-television-centric approach. In this approach, media such as video (which may include television programming), audio, images, web pages, or any suitable combination thereof, are provided to mobile user equipment 108, user television equipment 110, and user computer equipment 112 by server 130 via communications network 126. This approach is non-television centric because media (e.g., television programming) is provided by and delivered at least partially, and sometimes exclusively, via equipment that have not traditionally been primarily focused on the television viewing experience. Non-television-centric equipment is playing a larger role in the television viewing experience.

In some embodiments for this approach, communications network 126 is the Internet, Server 130 may provide for example, a website that is accessible to the user's equipment and provides an online guidance application for the user. In such approaches, the user's equipment may be, for example, a PC or a hand-held device such as a PDA or web-enabled cellular telephone that incorporates a web browser. In other embodiments, server 130 uses the Internet as a transmission medium but does not use the Web. In such approaches, the user's equipment may run a client application that enables the user to access media. In still other approaches, communications network 126 is a private communications network, such as a cellular phone network, that does not include the Internet.

In yet other approaches, communications network 126 includes a private communications network and the Internet. For example, a cellular telephone or other mobile-device service provider may provide Internet access to its subscribers via a private communications network, or may provide media such as video clips or television programs to its subscribers via the Internet and its own network.

The aforementioned approaches for providing media may, in some embodiments, be combined. For example, a distribution facility 104 may provide a television-centric media delivery system, while also providing users' equipment (e.g., 110 and 112) with access to other non-television-centric delivery systems provided by server 130. For example, a user's equipment may include a web-enabled, set-top box or a television enabled PC. Distribution facility 104 may, in addition to television and music programming, provide the user with Internet access whereby the user may access server 130 via communications network 126. Distribution facility 104 may communicate with communications network 126 over any suitable path 134, such as a wired path, a cable path, fiber-optic path, satellite path, or combination of such paths.

Media guidance applications may be provided using any approach suitable for the type of media and distribution system for which the applications are used. Media guidance applications may be, for example, stand-alone applications implemented on users' equipment. In other embodiments, media guidance applications may be client-server applications where only the client resides on the users' equipment. In still other embodiments, guidance applications may be provided as web sites accessed by a browser implemented on the users' equipment. Whatever the chosen implementation, the guidance application requires information about the media for which it is providing guidance. For example, titles or names of media, brief descriptions, or other information may be necessary to allow users to navigate among and find desired media selections.

In some television-centric embodiments, for example, the guidance application may be a stand-alone interactive television program guide that receives program guide data via a data feed (e.g., a continuous feed, trickle feed, or data in the vertical blanking interval of a channel). Data source 120 in system 100 may include a program listings database that is used to provide the user with associated program data such as schedule information, program descriptions, program information (e.g., actors, directors, release date, ratings, genre, etc.), related articles, interviews, reviews, metadata having links to related content, descriptive metadata, and other similar content or data relating to the television programs. In some embodiments, the data may also include content or video related to television programs. Data source 120 may also be used to provide promotions and advertisements (e.g., program guide advertisements and promotions for television programs), real-time data such as sports scores, stock quotes, news data, and weather data, application data for one or more media, guidance applications or other interactive applications, and any other suitable data for use by system 100. As another example, data source 120 may provide data indicating the types of information that may be included in interactive media guidance overlays (e.g., at the request of the user, absent user modification, etc.).

Program guide data may be provided to user equipment using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.).

In some television-centric embodiments, guidance data from data source 120 may be provided to users' equipment using a client-server approach. For example, a guidance application client residing on the user's equipment may initiate sessions with server 140 to obtain guidance data when needed.

There may be multiple data sources (such as data source 120) in system 100, although only one data source is shown in FIG. 1 to avoid overcomplicating the drawing. For example, a separate data source may be associated with each of a plurality of television broadcasters and may provide data that is specific to those broadcasters (e.g., advertisements for future programming of the broadcasters, logo data for displaying broadcasters, logos in program guide display screens, etc.). Data source 120 and any other system components of FIG. 1 may be provided using equipment at one or more locations. Systems components are drawn as single boxes in FIG. 1 to avoid overcomplicating the drawings.

Data source 120 may provide data to distribution facility 104 over communications path 122 for distribution to the associated user equipment over paths 116 and 118 (e.g., when data source 120 is located at a main facility). Communications path 122 may foe any suitable communications path such as a satellite communications path or other wireless path, a fiber-optic or other wired communications path, a path that supports Internet communications, or other suitable path or combination of such paths.

Data source 120 may also provide guidance data directly to mobile user equipment 108 (over path 124, communications network 126, and path 128), user television equipment 110 (over path 124, communications network 126, and path 136), and user computer equipment 112 (over path 124, communications network 126, and path 130). Paths 124, 128, 136, and 138 may be wired paths such as telephone lines, cable paths, fiber-optic paths, satellite paths, wireless paths, and any other suitable paths or a combination of such paths. Communications network 126 may be any suitable communications network, such as the Internet, the public switched telephone network, or a packet-based network.

Mobile user equipment 108, user television equipment 110, and user computer equipment 112 may use the program schedule data and other interactive media guidance application data to display program listings and other information (e.g., information on digital music) for the user. An interactive television program guide application or other suitable interactive media guidance, application may be used to display the information on the user's display (e.g., in one or more overlays that are displayed on top of video for a given television channel). Interactive displays may be generated and displayed for the user using any suitable approach. In one suitable approach, distribution facility 104, server 130, or another facility, may generate application display screens and may transmit the display screens to user equipment for display. In another suitable approach, user equipment may store data for use in one or more interactive displays (e.g., program schedule data, advertisements, logos, etc.), and an interactive media guidance application implemented at least partially on the user equipment may generate the interactive displays based on instructions received from distribution facility 104, server 130 or another facility. In some embodiments of the present invention, user equipment may store only the data that is used to generate the interactive television displays (e.g., storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays for the user.

In still other embodiments, interactive media guidance applications (television-centric and non-television centric) may be provided online as, for example, websites. For example, server 130 may provide an online interactive television program guide. As another example, user computer equipment 112 may be web-enabled to allow the user to access an online guidance application (which may be modified from its original version to make it appropriate for user computer equipment 112). Alternatively, user computer equipment 112 may have an applet that communicates with server 130 to obtain guidance data via the Internet.

Server 130 may receive program schedule data and other data from data source 120 via communications path 124, communications network 126, communications path 132, or another suitable path or combination of paths. Path 132 may foe a satellite path, fiber-optic path, wired path, or any other path or combination of paths. Mobile user equipment 108 may access the online interactive media guidance application and other sources from server 130 via communications path 128, Mobile user equipment 108 may also access the application and other services on server 130 via communications path 114, distribution facility 104, and communications path 134.

User equipment such as user television equipment 110 and user computer equipment 112 may access the online interactive media guidance application and server 130 using similar arrangements. User television equipment 110 may access the online interactive media guidance application and server 130 using communications path 136 or using path 116, distribution facility 104, and path 134. User computer equipment 312 may access the online interactive media guidance application and server 130 using communications path 138 or using path 116, distribution facility 104, and path 134. Paths 136 and 138 may be any suitable paths such as wired paths, cable paths, fiber-optic paths, wireless paths, satellite paths, or a combination of such paths.

If desired, an interactive media guidance application such as a network-based video recorder or a video-on-demand application may be supported using server 140, server 130, or equipment at service provider 142. Video-on-demand content and video recorded using a network-based video recorder arrangement may be stored on server 140, server 130, or at service provider 142 and may be provided to the user equipment when requested by users. An interactive television program guide, for example, may be used to support the functions of a personal video recorder (sometimes called a digital video recorder) that is implemented using user television equipment 110 or user computer equipment 112. Illustrative equipment that may be used to support personal video recorder functions include specialized personal video recorder devices, integrated receiver decoders (IRDs), set-top boxes with integrated or external hard drives, or personal computers with video recording capabilities.

Figure 2:
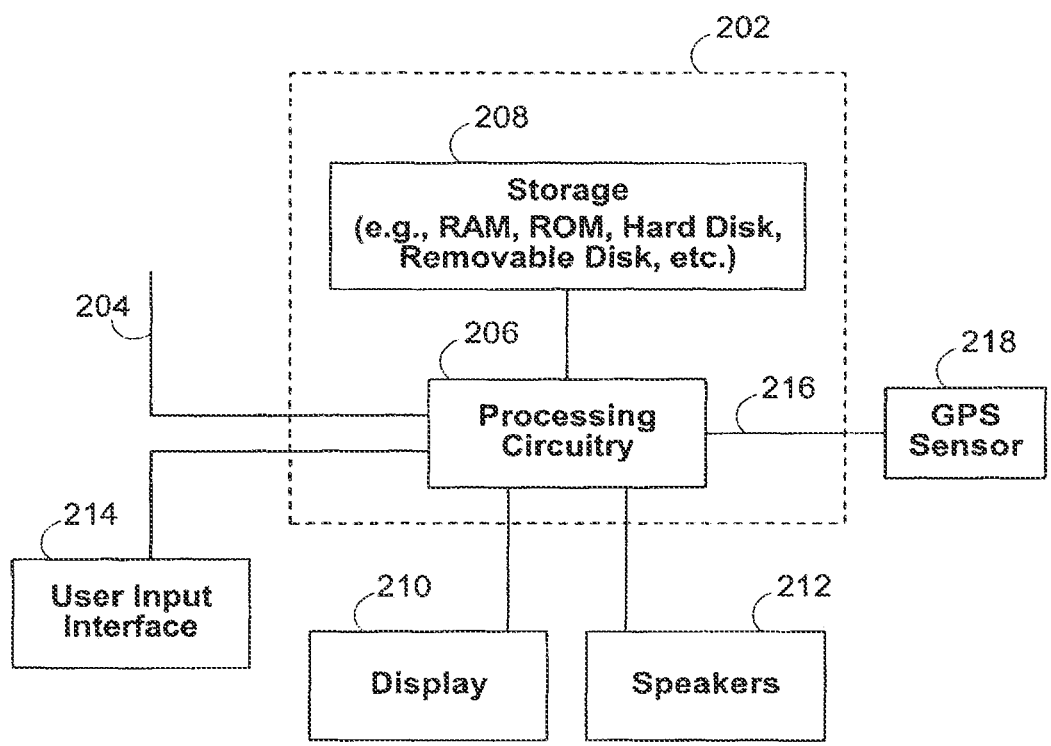
FIG. 2 is a diagram of illustrative mobile user equipment in accordance with the present invention.

FIG. 2 shows an illustrative embodiment of mobile user equipment 108 in accordance with the present invention. Mobile user equipment 103 may include control circuitry 202, input/output 204, display 210, speakers 212, user input interface 214, and OPS sensor 218.

Control circuitry 202 may include processing circuitry 206 and storage 208. Processing circuitry 206 may be any suitable processor such as, for example, a microprocessor, a microcontroller, a digital signal processor, or a programmable logic device. Storage 208 may be any suitable storage device or combination of suitable storage devices including, for example, a magnetic storage device, solid state memory, or an optical disk drive. Storage 208 may be controlled by processing circuitry 208 to store or retrieve data.

Input/output 204 may include a wireless transceiver that allows mobile user equipment 108 to communicate wirelessly with communications network 126 (FIG. 1). Input/output 204 may be used to transmit requests to network processors (e.g., server 130 or 140) and receive information from media databases (e.g., server 130 or 140).

A user may control control circuitry 202 using user input interface 214. User input interface 214 may be any suitable user interface, such as a mouse, trackball, keypad, keyboard, touch screen, touch pad, voice recognition interface, or a remote control.

Display 210 may be any suitable display device such as, for example, an LCD display. Speakers 212 may be any suitable audio speaker. Display 210 and speakers 312 may be controlled by processing circuitry 206.

An interactive media guidance application may be implemented on mobile user equipment 108. Processing circuitry 206 may execute the interactive media guidance application and direct display 210 to display screens of the interactive media guidance application. The screens of the interactive media guidance application may include menus and options. The user may interact with the menus and options using user input interface 214.

The interactive media guidance application may allow the user to remotely perform program guide functions. In particular, the interactive media guidance application may allow the user to access media information (e.g., program listings information) on mobile user equipment 108. Processor 206 may send a request for media information to a media database (e.g., server 130 or server 140 (FIG. 1)) via input/output 204 and display the received media information on, for example, a media listings screen.

The interactive media guidance application may allow the user to search for media information using various criteria (e.g., title, date, or network). In some embodiments, the interactive media guidance application may search media information stored on storage 208. In some embodiments, the interactive media guidance application may send a search request to a media database (e.g., server 130 or server 140 (FIG. 1)) via input/output 204 and communications network 126. The interactive media guidance application may display a list of media that meet the search criteria.

The interactive media guidance application may also allow the user to set a reminder for a television program. The reminder may be displayed by mobile user equipment 108 to alert the user that the television program is about to begin. In some embodiments, the interactive media guidance application may allow the user to send reminders to another mobile user equipment via input/output 204 and communications network 126. The reminder may foe displayed by the other mobile user equipment prior to the beginning of the television program.

The interactive media guidance application may allow the user to remotely schedule recordings of television programs on recording devices. In some embodiments, mobile user equipment 108 may be associated with user equipment (e.g., user television equipment 110 or user computer equipment 112 (FIG. 1)) having recording capabilities. In some embodiments, the interactive media guidance application may prompt the user to select user equipment with which to record television programs. Processing circuitry 206 may send a command to record a television program to an interactive media guidance application implemented on the user equipment via input/output 204, communications network 126, and media distribution facility 104. Remote recording is discussed in greater detail in Ellis et al. U.S. Patent Publication No. 2005/0028208-A1, which has been incorporated by reference in its entirety.

The interactive media guidance application implemented on mobile user equipment 108 may also be configured to perform location-based services. The location of mobile user equipment 108 may be determined using several different approaches. In one approach, GPS sensor 218 may receive timing signals from a plurality of GPS satellites 150 (FIG. 1). GPS sensor 218 may analyze the received timing signals to determine the distance to each of GPS satellites 150. GPS sensor 218 may calculate the location of mobile user equipment 108 based on the distances to GPS satellites ISO.

In another approach, a network processor (e.g., server 130 or server 140 (FIG. 1)) may triangulate the radio emissions from mobile user equipment 108 to determine the location of mobile user equipment 108.

In yet another approach, the network processor may perform RF multipath fingerprinting by creating a database of fingerprints that correspond to radio emissions transmitted from different locations. The network processor may determine the location of mobile user equipment 108 by matching the received radio emissions to one of the stored fingerprints.

Figure 3B:
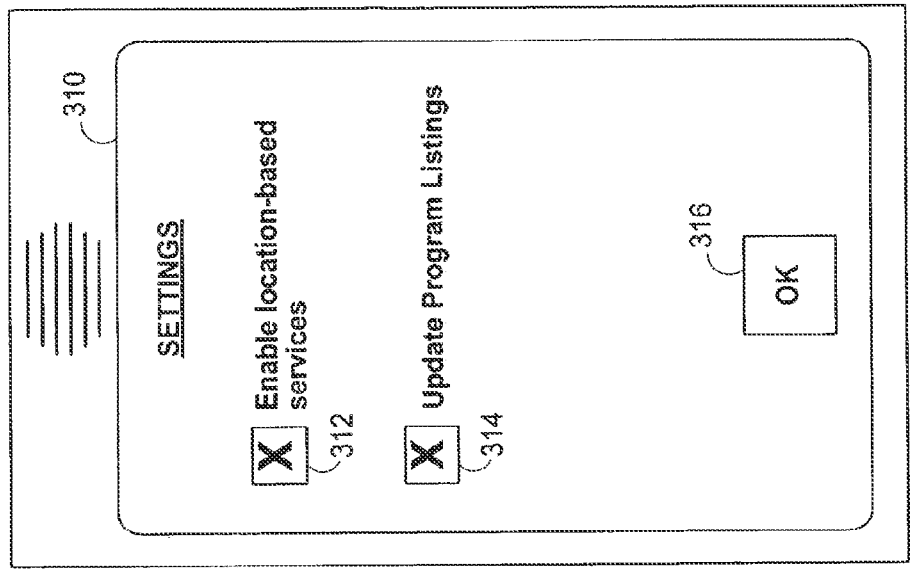
FIG. 3b shows an illustrative screen of an interactive media guidance application implemented on mobile user equipment for selecting settings in accordance with one embodiment of the present invention.
Figure 3A:
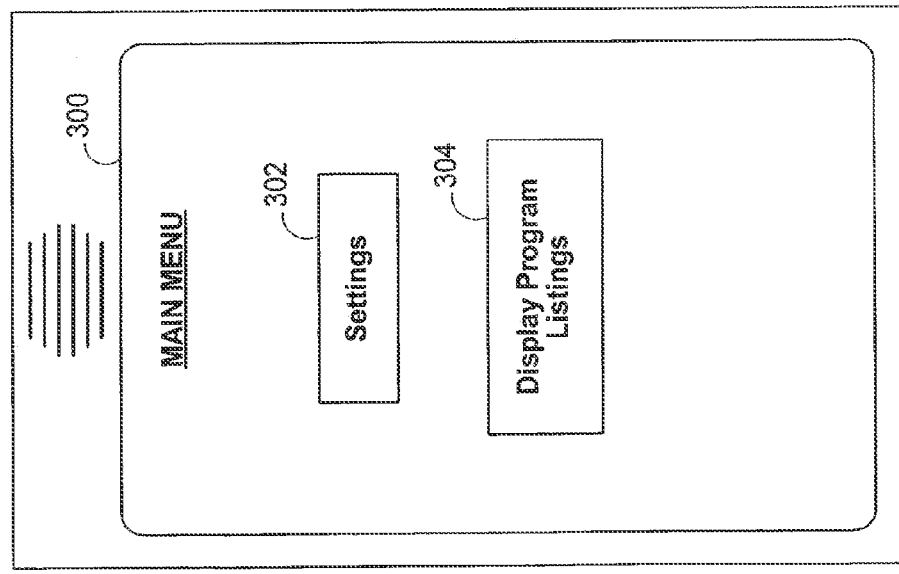
FIG. 3a shows an illustrative screen of an interactive media guidance application implemented on mobile user equipment for providing a user with a menu in accordance with one embodiment of the present invention.

FIG. 3*a* shows an illustrative screen 300 of an interactive media guidance application implemented on mobile user equipment (e.g., mobile user equipment 108 (FIG. 1)) for providing a user with a menu in accordance with one embodiment of the present invention. Screen 300 may include a settings option 302 and a program listings option 304.

In response to the user selecting settings option 302, the interactive media guidance application may display a screen that allows the user to select, among other things, options for configuring location-based services. An illustrative settings screen is discussed in greater detail below.

In response to the user selecting program listings option 304, the interactive media guidance application may display a screen that includes program listings for a particular geographical region. Illustrative program listings screens are discussed in greater detail below.

Screen 300 may also include additional options, such as, for example, options for allowing the user to select the types of media information to retrieve (e.g., video-on-demand listings, pay-per-view listings, advertisements).

It should be understood by one skilled in the art that options 302 and 304 (and any other options displayed by the interactive media guidance application) may be selected using any suitable user input. For example, the display screen of the mobile user equipment may be touch sensitive and the options may be selected with, for example, a stylus. In another example, the user may use navigation keys on the keypad of the mobile user equipment to select options.

FIG. 3*b* shows an illustrative screen 310 of an interactive media guidance application implemented on mobile user equipment for selecting settings in accordance with one embodiment of the present invention. As shown in FIG. 3*b*, screen 310 includes checkboxes 312 and 314 and an OK button 316. Screen 310 may be displayed, for example, in response to the user selecting settings option 302 from screen 300 (FIG. 3*a*).

The interactive media guidance application may allow the user to select checkbox 312 to enable location-based services. In response to the user selecting checkbox 312, the interactive media guidance application may foe configured to activate circuitry for determining the user's location. For example, the interactive media guidance application may activate a GPS sensor 218 (FIG. 2) on the mobile user equipment. In another example, the interactive media guidance application may instruct a network processor (e.g., server 130 or server 140 (FIG. 1)) to perform a network-based positioning method (e.g., triangulation, RF multipath fingerprinting, etc.) to determine the location of the mobile user equipment.

The interactive media guidance application may allow the user to select checkbox 314 to enable location-based updates of program listing information. In some embodiments, the interactive media guidance application may only allow the user to select checkbox 314 if the checkbox 312 has already been checked. In response to the user selecting checkbox 314, the interactive media guidance application, may be configured to update program listings information based on the user's current location. In some embodiments, the interactive media guidance application may automatically update program listings information for the user's current location at periodic intervals. In response to automatically updating program listings information, the interactive media guidance application may display the updated program listing information to the user.

The interactive media guidance application may allow the user to select OK button 316 to save the settings selected by the user.

It should be understood by one skilled in the art that screen 310 may include additional options without departing from the scope of the present invention. For example, screen 310 may include options allowing the user to select settings relating to automatically updating program listings information at periodic intervals or receiving a user prompt to update the program listings information.

In another example, screen 310 may include options for allowing the user to select the amount of program, listings information to retrieve when performing a location-based update (e.g., program listings for the next hour, program listings for the next six hours, program listings for favorite channels, etc.).

In another example, screen 310 may include options for allowing the user to select to update other types of media information or combinations of media information, including, for example, pay-per-view and video-on-demand listings, advertisements, etc.

Figure 3D:
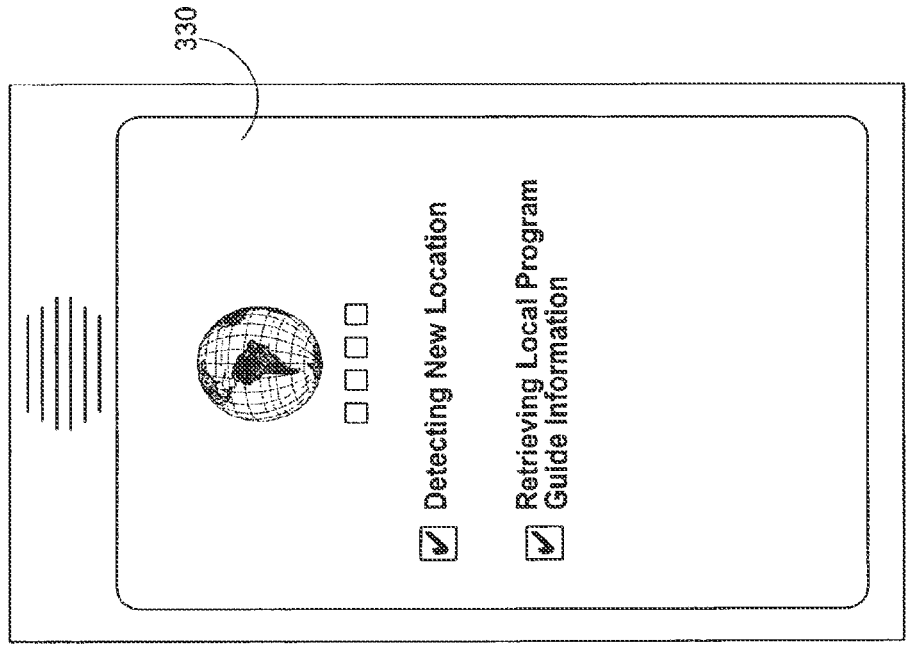
FIGS. 3d-f show an illustrative screen of an interactive media guidance application implemented on mobile user equipment for displaying the status of program listings information updates in accordance with one embodiment of the present invention.
Figure 3C:
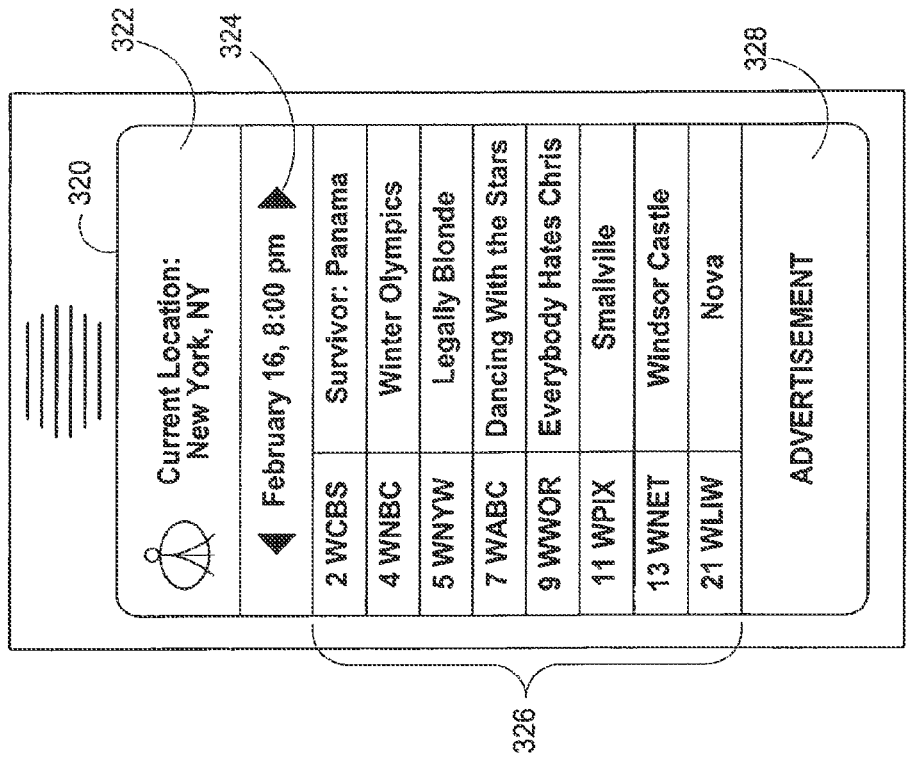
FIG. 3c shows an illustrative screen for displaying program listings information in an interactive media guidance application implemented on mobile user equipment in accordance with one embodiment of the present invention.

FIG. 3c shows an illustrative screen 320 for displaying program listings information, in an interactive media guidance application implemented on mobile user equipment in accordance with one embodiment of the present invention. Screen 320 includes location area 322, date/time area 324, program listings, area 326, and advertisement area 328. Screen 320 may be displayed, for example, in response to the user selecting program listings option 304 from screen 300 (FIG. 3a).

Location area 322 includes information regarding the user's current location. The information may be displayed in any suitable format, such as, for example, city and state format, zip code format, area code format, latitude/longitude format, and any other suitable format or combination of formats. As mentioned above, in some embodiments, the mobile user equipment may include a GPS sensor (e.g., GPS sensor 218 (FIG. 2)). The GPS sensor may negotiate with one or more GPS satellites (e.g., GPS satellite 150 (FIG. 1)) to determine the location of the mobile user equipment. The interactive media guidance application may display the location of the mobile user equipment in a suitable format in screen 320. In some embodiments, the mobile user equipment may utilize a network-based positioning method (e.g., triangulation, RF multipath fingerprinting, etc.) to determine the location of the mobile user equipment. A network processor (e.g., server 130 (FIG. 1)) may transmit to the mobile user equipment information regarding its location, in response, the interactive media guidance application may display the location of the mobile user equipment in a suitable format in screen 320.

Date/time area 324 indicates a time slot to which the program listings displayed in program listings display area 326 correspond. The time slot may be displayed in any suitable format. In some embodiments, the user may change the time slot by pressing directional keys on the mobile user equipment. As a result of the user changing the time slot, the interactive media guidance application may display program listings for the new time slot in program listings display area 326.

Program listings area 326 includes program listings for a plurality of television channels corresponding to a selected time slot and the user's current location. The interactive media guidance application may retrieve the program listings from a program listings database implemented on, for example, server 130 or server 140 (FIG. 1). The interactive media guidance application may allow the user to select one of the program listings to, for example, view information regarding the selected program, set a reminder for the selected program, designate the channel on which, the selected program is to be broadcast as a favorite channel, remotely schedule a recording of the selected program on a recording device, or perform any other suitable action.

Advertisement area 328 includes any suitable promotional or advertising information. In some embodiments, portions of the information may be selectable, allowing the user to order a related product, program, or service. For example, the user may navigate a highlight region using navigation keys on the mobile user equipment to advertisement area 328 to select promotional or advertising information.

In some embodiments, the promotional or advertising information, may be selected based on the user's current location. For example, the interactive media guidance application may provide an advertisement database implemented on server 130 or server 148 (FIG. 1) with information regarding the user's current location and the advertisement database may provide suitable location-based advertisements to the interactive media guidance application for display.

Figure 3F:
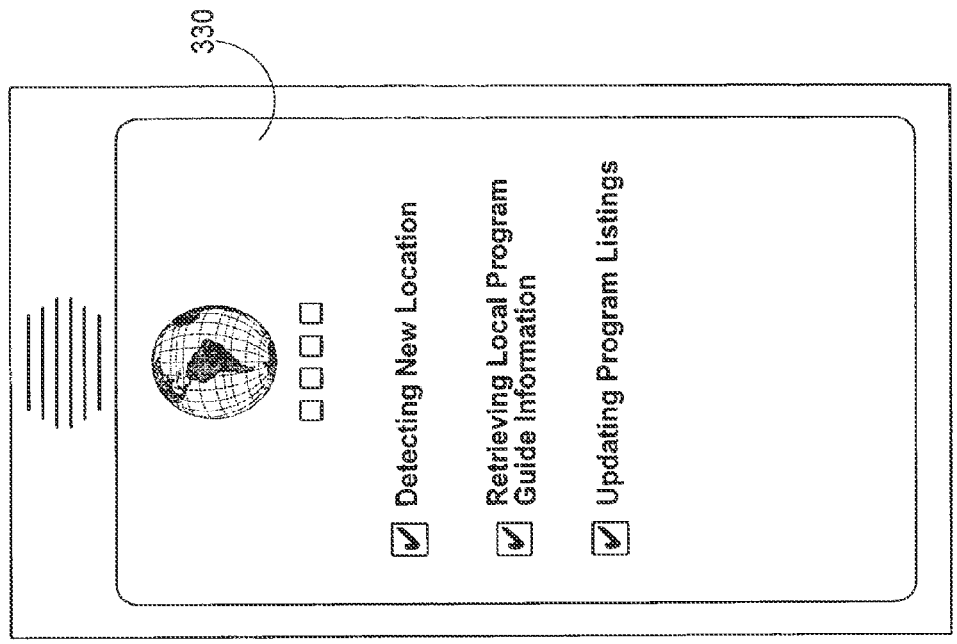
Figure 3E:
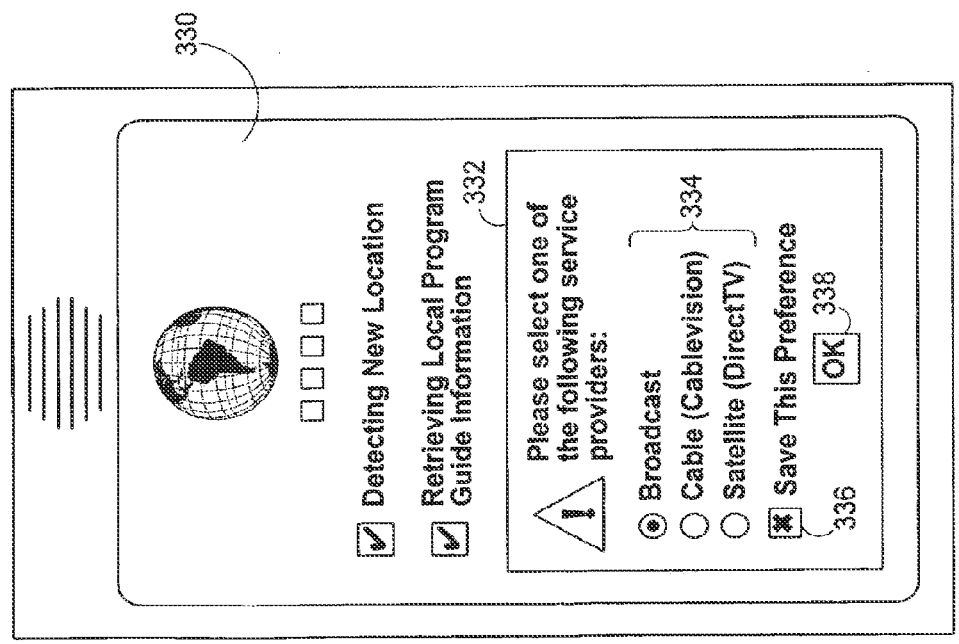

FIGS. 3d-f show an illustrative screen 330 of an interactive media guidance application implemented on mobile user equipment for displaying the status of program listing information updates in accordance with one embodiment of the present invention. Screen 330 includes a listing of tasks that is displayed as the tasks are being performed by the interactive media guidance application. Screen 330 may be displayed in response to the user changing his location to a location that receives different television programming or the user prompting the interactive media guidance application to retrieve program listings information for the user's current location.

As shown in FIG. 3d, one of the task listings indicates that the interactive media guidance application is detecting the user's new location. In some embodiments, a GPS sensor in the mobile user equipment on which the interactive media guidance application is implemented may interact with one or more GPS satellites to pinpoint the user's current location. In some embodiments, the network may perform triangulation, RF multipath fingerprinting, or any other suitable technique to determine the user's current location and send information regarding the user's current location to the mobile user equipment.

The interactive media guidance application may display another task listing in screen 330 that indicates that the interactive media guidance application is retrieving local program guide information.

The information regarding the user's current, location may be converted into a format that is accepted by the database on which program listings information is stored (e.g., server 140 (FIG. 1)). For example, if the program listings database organizes program listings information by ZIP code, the information regarding the user's current information may be converted into a ZIP code and transmit the SIP code to the program listings database. The conversion may be performed by the interactive media guidance application if, for example, a GPS sensor determines the user's current location. The conversion may be performed by a network processor (e.g., server 130 or server 140 (FIG. 1)) if, for example, the network uses triangulation or RF multipath fingerprinting to determine the user's current location.

As shown in FIG. 3e, the interactive media guidance application may display dialog box 332 if the program listings database indicates that more than one service provider offers television programming at the user's current location.

Dialog box 332 may include service provider options 334, checkbox 336, and OK button 338. Service provider options 334 may allow the user to select a service provider for which to retrieve program listings information.

Dialog box 332 may also include checkbox 338 that the user may select to save the user's preference for the current location. If the user selects one of service provider options 334 and checkbox 336, the interactive media guidance application may be configured to automatically retrieve program listings information for the selected service provider the next time the user returns to the current location.

In response to the user selecting OK button 338, the interactive medial guidance application may initiate retrieval of the program listings information for the selected service provider. The interactive media guidance application may also remove dialog box 332 from screen 330. In some embodiments, the interactive media guidance application may transmit the user's current location to the server on which the program listings information is stored. In some embodiments, a network processor may determine the user's current location and transmit the user's current location to the server on which the program listings Information is stored. The interactive media guidance application may store the retrieved program listings information on any suitable memory element on the mobile user equipment (e.g., internal memory, removable media, etc.).

As shown in FIG. 3f, the interactive media guidance application may display smother task listing in screen 330 that indicates that the interactive media guidance application is updating the program listings information. In some embodiments, the interactive media guidance application may archive the program listings information for the user's previous location in memory. In some embodiments, the archived program listings information may be used to locally update program guide settings if the user returns to a previous location. In some embodiments, the archived program listings information may be accessed by the user while the user is away from, the previous location.

The interactive media guidance application may update the program listings information such that the program listings information for the user's current location is displayed in response to a request to display program listings information. After the interactive media guidance application has finished updating the program, listings information, the interactive media guidance application may return to the screen that was displayed prior to screen 320.

Figure 3G:
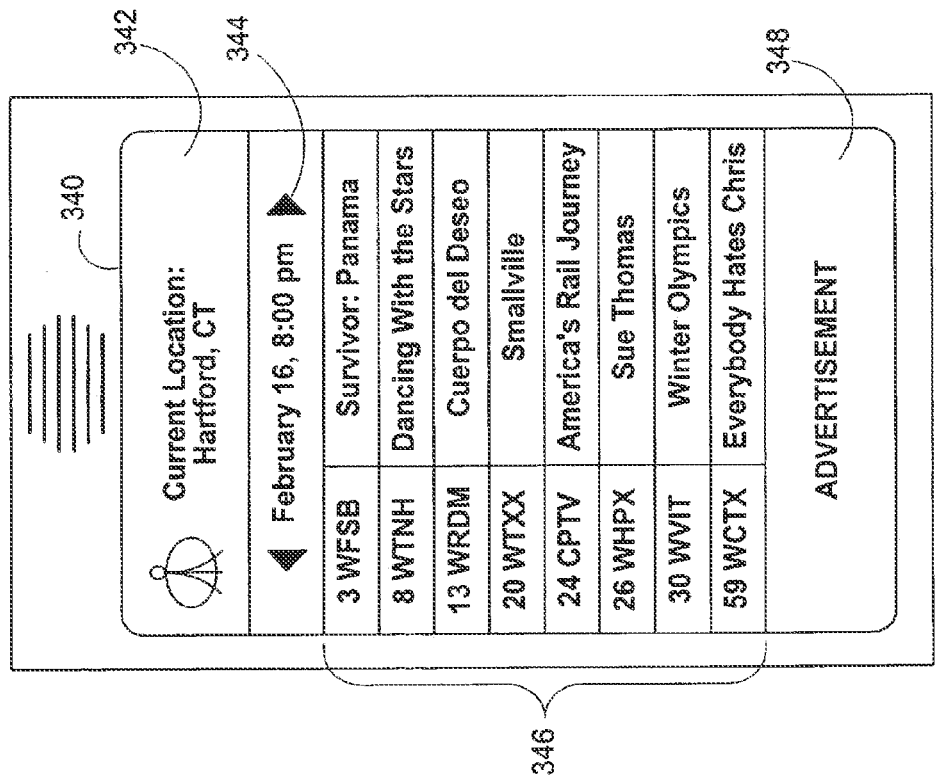
FIG. 3g shows an illustrative screen of an interactive media guidance application implemented on mobile user equipment for displaying updated program listings information in accordance with one embodiment of the present invention.

FIG. 3g shows an illustrative screen 340 of an interactive media guidance application implemented on mobile user equipment for displaying program listings information in accordance with one embodiment of the present invention. Screen 340 includes, for example, updated location area 342, date/time area 344, updated program listings area 346, and advertisement area 348. Screen 340 also include any other suitable area or combination of areas. Screen 340 may be displayed, for example. In response to the interactive media guidance application updating program listings information based on the user's location.

Updated location area 342 indicates the user's current location as determined by or communicated to the mobile user equipment. Date/time area 344 indicates a time slot for the updated program listings displayed in updated program listings area 346. In some embodiments, the time slot displayed in date/time area 344 may be the same time slot that was displayed prior to the update of program listing information. In some embodiments, the time slot displayed in date/time area 344 may foe the current time slot. Updated program listings area 346 includes program listings for the user's current location provided by the selected service provider. Advertisement area 348 includes advertising or promotional information.

It should be understood that screens 300, 310, 320, 330, and 340 (FIGS. 3a-g) are merely illustrative and that these screens may include additional areas and/or information without departing from the scope of the present invention.

Figure 4A:
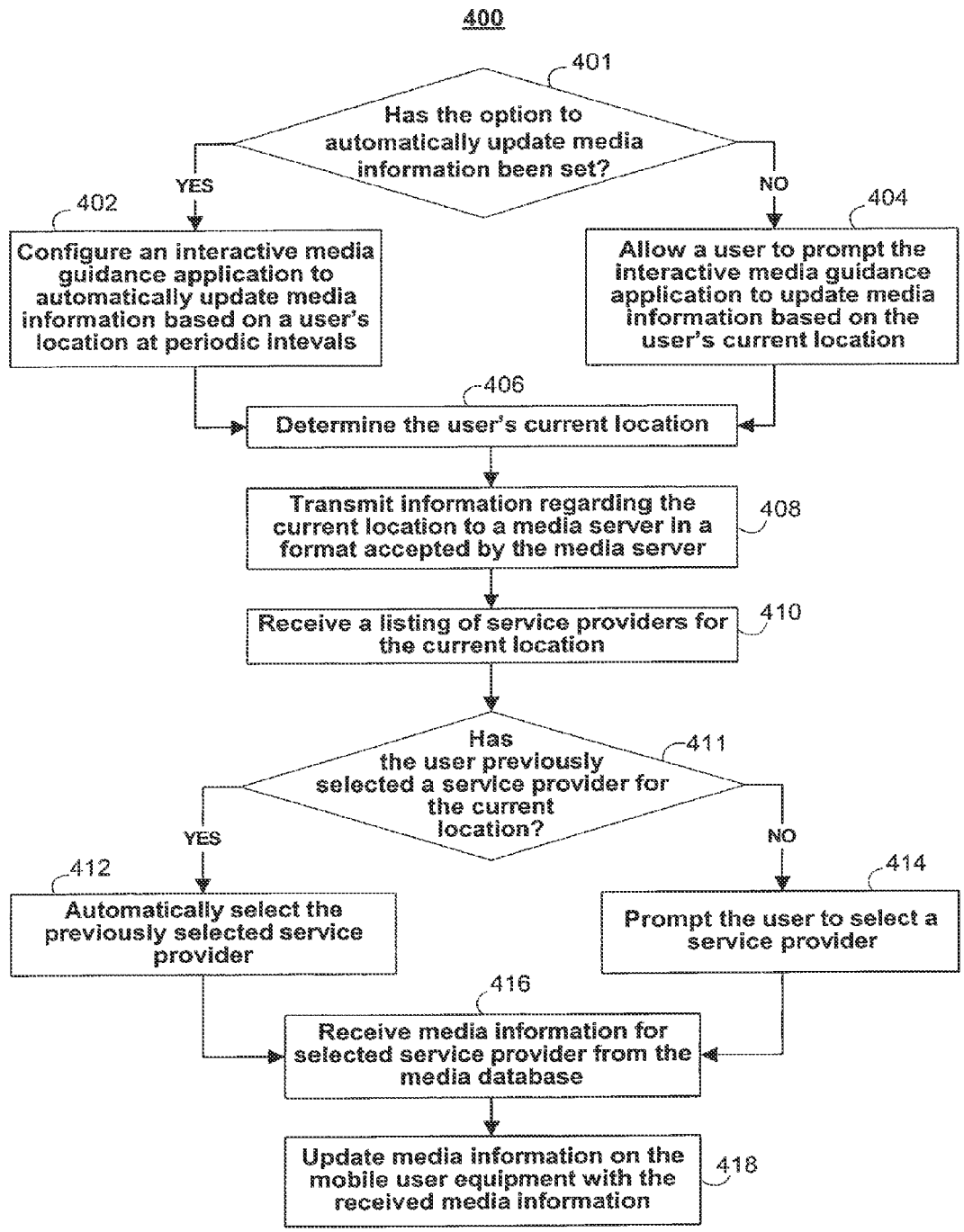
FIG. 4a is an illustrative flow diagram for using an interactive media guidance application implemented on mobile user equipment to retrieve program listings information based on a user's current location in accordance with one embodiment of the present invention.

FIG. 4a is an illustrative flow diagram 400 for using an interactive media guidance application implemented on mobile user equipment to retrieve program listings information based on a user's current location in accordance with one embodiment of the present invention.

At step 401, the interactive media guidance application may determine whether an option to automatically update program listings information has been set. For example, the user may select an option displayed in a settings screen (e.g., screen 410 (FIG. 4b)) that configures the interactive media guidance application, to automatically update media Information based on the user's location. The user may also select a periodic interval for performing updates of media information in the settings screen.

At step 402, the interactive media guidance application is configured to automatically update media, information based on a user's location at periodic intervals. The interactive media guidance application may determine the amount of time elapsed since the last update of media information and compare the elapsed time with the selected periodic interval. Once the elapsed time exceeds the selected interval, the interactive media guidance application initiates an update of media information.

Alternatively, at step 404, the interactive media guidance application is prompted by the user to update media information based on the user's current location. For example, the user may press a dedicated key to initiate an update of media information.

At step 406, the interactive media guidance application determines the user's current location. In some embodiments, the mobile user equipment may include a GPS sensor that is configured to determine the user's current location. This approach is discussed in greater detail in connection with FIG. 4b. In some embodiments, a network processor (e.g., server 130 or server 140 (FIG. 1)) may perform a network-based positioning technique (e.g., triangulation or RF multipath fingerprinting) to determine the user's current location. This approach is discussed in greater detail in connection with FIG. 4c.

At step 408, the interactive media guidance application transmits information regarding the user's current location to a media database in a format accepted by the media database. For example, if the mobile user equipment has determined the user's current location using GPS, the mobile user equipment may transmit information regarding the user's location to the media database. In another example, if the network processor has used a network-based positioning technique to determine the user's current location, the network processor may transmit information regarding the user's location to the media database. Alternatively, the network processor may send the information to the mobile user equipment for relaying to the media database. The media database may be implemented on server 130 or server 140 (FIG. 1). In some embodiments, the media database may aggregate media information for a plurality of service providers. In some embodiments, the network processor may be configured to access media information based on location from the media database. In this approach, the network processor is not required to communicate the user's location to the media database.

The interactive media guidance application may convert information regarding the user's current location into a format that is accepted by the media database as a search parameter. For example, if the GPS sensor has provided the user's location in a latitude/longitude format and the media database accepts ZIP codes, the interactive media guidance application may determine the SIP code corresponding to the latitude and longitude for the user's current location. In particular, the interactive media guidance application may send a request to a server to convert the location information to a ZIP code or the interactive media guidance application may perform the conversion by referring to data correlating latitude and longitude information with SIP codes.

At step 410, if there is more than one service provider for the user's current location, the interactive media guidance application may receive a listing of service providers for the user's current location. Service providers may include broadcast, cable, satellite providers, fiber optic, online, and any other suitable service providers.

At step 411, the interactive media guidance application may determine whether the user has previously selected one of the service providers for the current location.

At step 412, if the user has previously selected one of the service providers for the current location, the interactive media guidance application automatically selects the previously selected service provider from which to receive media information. For example, the user may currently be located in Minneapolis, Min. If the user was in Minneapolis a week ago and previously selected to receive media information for television broadcast providers, the interactive media guidance application may automatically select to receive media information for television broadcast providers in accordance with the user's previous selection.

In some embodiments, the user may select to receive media information for a service provider for all locations. The interactive media guidance application may automatically select, to receive media information for the default service provider.

Alternatively, at step 414, if the user has not previously selected one of the service providers for the user's current location, the interactive media guidance application prompts the user to select a service provider for which to receive media information. For example, as shown in FIG. 3e, the interactive media guidance application may display a dialog box prompting the user to select a service provider for which to receive media information.

At step 416, the interactive media guidance application may receive media information for the selected service provider from the media database. For example, if the media database is a program listings database, the interactive media guidance application may receive program listings information for the user's current location. If the media database is an advertisement database, the interactive media guidance application may receive advertisements targeted for the user's current location.

At step 418, the interactive media guidance application may update the media information on the mobile user equipment with the received media information. For example, a program listings screen may be updated with the program listings received from the media database.

Figure 4B:
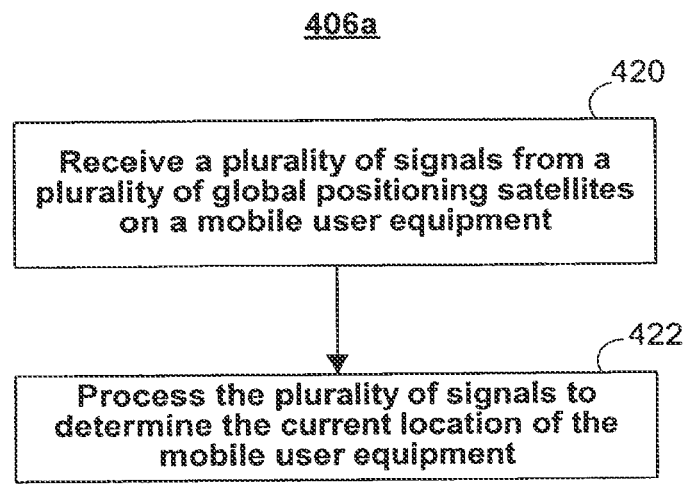
FIG. 4b is an illustrative flow diagram for determining the user's current location using a GPS sensor implemented on mobile user equipment in accordance with one embodiment of the present invention.

FIG. 4b is an illustrative flow diagram 408a for determining the user's current location using a GPS sensor implemented on mobile user equipment in accordance with one embodiment of the present invention.

At step 420, the mobile user equipment receives a plurality of signals from a plurality of global positioning satellites 150 (FIG. 1). As shown in FIG. 2, the mobile user equipment may include GPS sensor 218 for receiving signals from GPS satellites 150.

At step 422, the GPS sensor processes the received signals to determine the current location of the mobile user equipment. In particular, the GPS sensor may determine the distance to GPS satellites 150 and perform trilateration to determine its precise location.

Figure 4C:
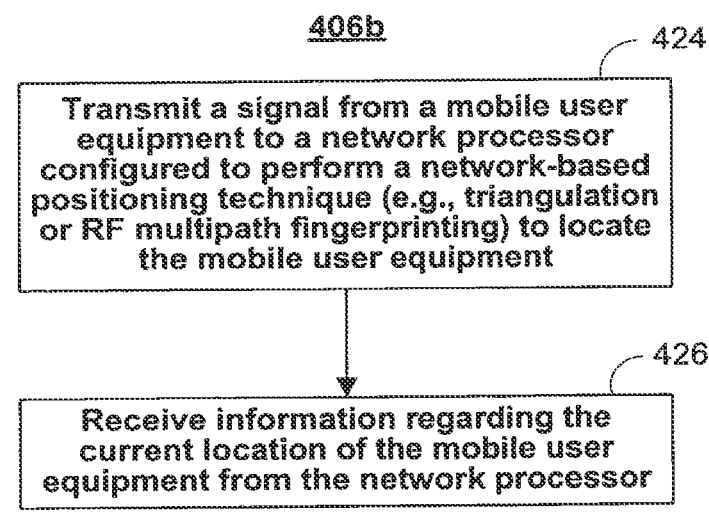
FIG. 4c is an illustrative flow diagram for determining the user's current location using a network-based positioning technique in accordance with one embodiment of the present invention.

FIG. 4c is an illustrative flow diagram 406b for determining the user's current location using a network-based positioning technique in accordance with one embodiment of the present invention.

At step 424, a signal is transmitted from a mobile user equipment to a network processor (e.g., server 130 or server 140 (FIG. 1)). The network processor may analyze the characteristics of the transmitted signal to determine the user's current location. In some embodiments, the network processor triangulates the radio emissions from the mobile user equipment. In some embodiments, the network processor performs RF multipath fingerprinting in which the fingerprint of the transmitted signal is measured and compared to the fingerprints of test signals whose origins are known.

At step 426, the interactive media guidance application receives information regarding the current location of the mobile user equipment from the network processor.

Figure 4D:
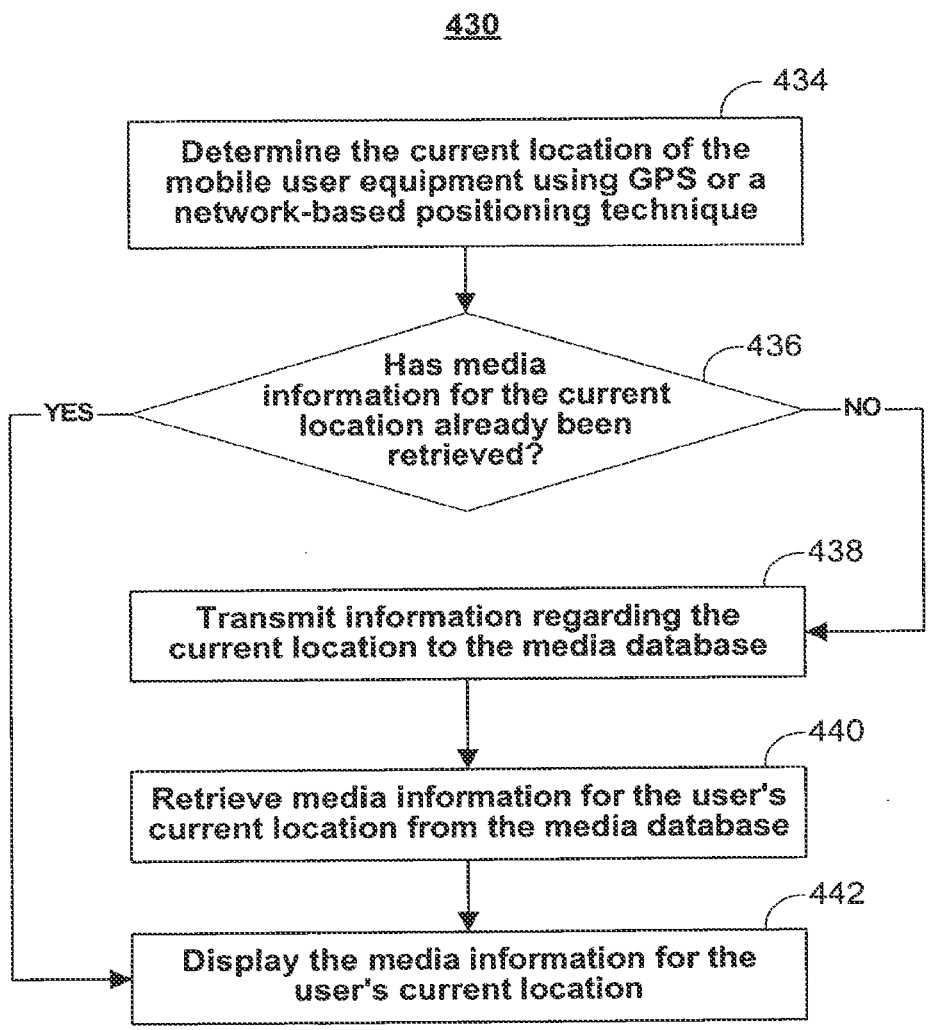
FIG. 4d is an illustrative flow diagram for using an interactive media guidance application implemented on mobile user equipment to retrieve program listings information based on a user's current location in accordance with one embodiment of the present invention.

FIG. 4d is an illustrative flow diagram 430 for using aft interactive media guidance application implemented on mobile user equipment to retrieve program listings information based on a user's current location in accordance with one embodiment of the present invention.

At step 434, the interactive media guidance, application may determine the user's current location using any suitable approach, such as, for example, the approaches described in connection with FIGS. 4b and 4c.

At step 436, the interactive media guidance application may determine if media information for the user's current location has already been retrieved. For example, the user may have retrieved media information for a plurality of geographic regions from the media database. In another example, the user may have previously visited the current location and may have retrieved media Information for the current location during the previous visit. The interactive media guidance application may search locally-stored media information to determine if any of the media information is specific to the user's current location.

If the media information, for the user's current location has already been retrieved, then at step 442, the interactive media guidance application displays the media information for the user's current location.

If the media information for the user's current location has not yet been retrieved, then at step 438, the interactive media guidance application transmits information regarding the user's current information to the media database. The interactive media guidance application may be required to convert the information regarding the user's current location into a format accepted by the media database, as described in connection with FIG. 4a. In some embodiments, the network processor may be configured to access media information based on location from the media database. In this approach, the network processor is not required to communicate the user's location to the media database.

If more than one service provider is available for the user's current location, the user may select a service provider for which to retrieve media information (as discussed in step 414 (FIG. 4a)). Alternatively, the interactive media guidance application may automatically select a service provider if the user previously selected a service provider for the user's current location (as discussed in step 412 (FIG. 4a)).

At step 440, the interactive media guidance application, retrieves; media information for the user's current location from the media database.

At step 442, the interactive media guidance application, displays the media information for the user's current location. For example, the interactive, media guidance application may display the media information in a program: listings display screen (e.g., screen 320 (FIG. 3c)).

Figure 4E:
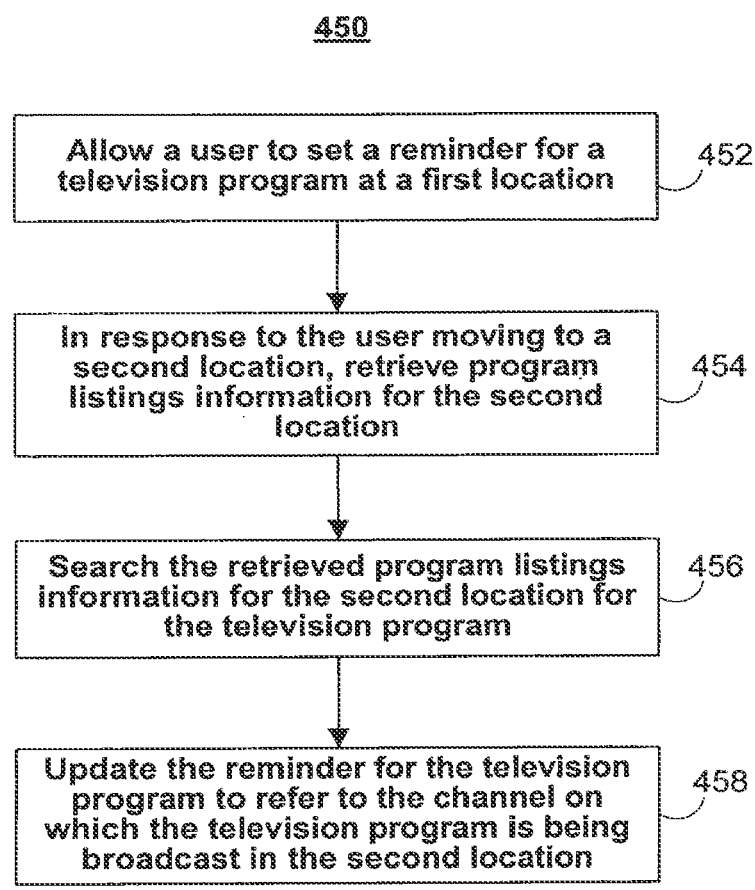
FIG. 4e is an illustrative flow diagram for using an interactive media guidance application implemented on mobile user equipment to update program reminders based on a user's location in accordance with one embodiment of the present invention.

FIG. 4e is an illustrative flow diagram 450 for using an interactive media guidance application implemented on mobile user equipment to update program reminders based on a user's location in accordance with one embodiment of the present invention.

At step 452, the interactive media guidance application allows the user to set a reminder for a television program at a first location. For example, the user may set a reminder for "Survivor" while the user is at LaGuardia Airport.

At step 454, in response to the user moving to a second location (e.g., Boston, Mass.), the interactive media guidance application retrieves program listings information for the second location. The interactive media guidance application may retrieve program listings information for the second location in accordance with, the approach discussed in FIG. 4a.

At step 456, the interactive media guidance application searches the retrieved program listings information for the second location for the television program. For example, the interactive media, guidance application may search the retrieved program listings for an entry for "Survivor".

At step 458, the interactive media guidance application updates the reminder to refer to the channel on which the television program is being broadcast in the second location. For example, the interactive media guidance application may update the reminder for "Survivor" to indicate that it will be broadcast on Channel 2 in Boston.

Figure 4F:
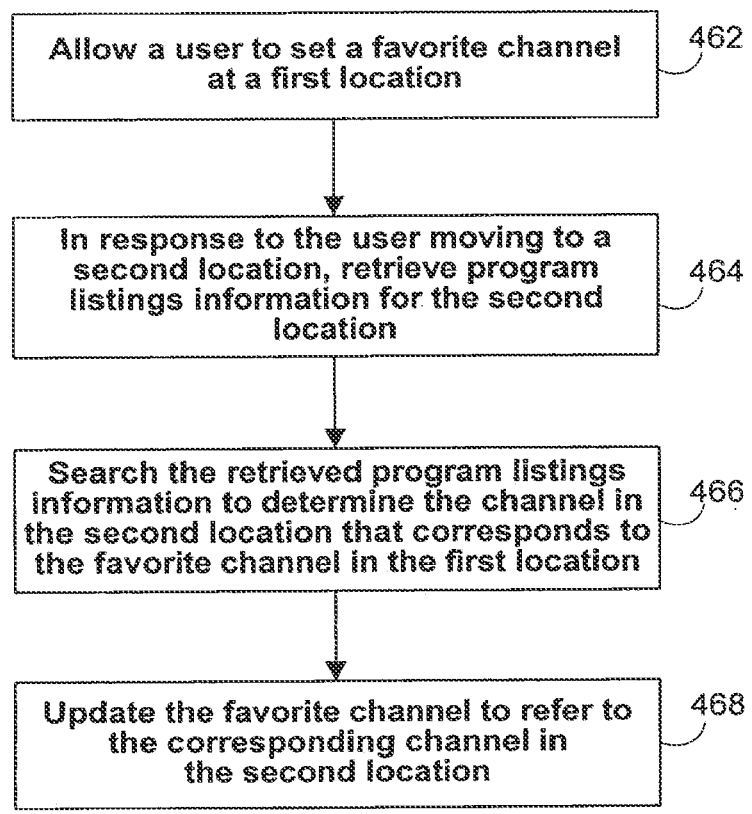
FIG. 4f is an illustrative flow diagram for using an interactive media guidance application implemented on mobile user equipment to update favorite channels based on a user's location in accordance, with one embodiment of the present invent ion.

FIG. 4f is an illustrative flow diagram 460 for using an interactive media guidance application implemented on mobile user equipment to update favorite channels based on a user's location in accordance with one embodiment of the present invention.

At step 462, the interactive media guidance application allows the user to set a favorite channel at a first location. For example, the user may set WNBC 4 as a favorite channel while the user is at LaGuardia Airport.

At step 464, in response to the user moving to a second location (e.g., Boston, Mass.), the interactive media guidance application retrieves program listings information for the second location. The interactive media guidance application may retrieve program listings information for the second location in accordance with the approach discussed in FIG. 4a.

At step 466, the interactive media guidance application searches the program listings information to determine the channel in the second location that corresponds to the favorite channel in the first location. For example, the interactive media guidance application may compare the program listings Information for the favorite channel with program listings information for channels at the second location to determine if any of the channels correspond to the favorite channel. The interactive media guidance application may determine that the local NBC affiliate in Boston is WHDH 7.

At step 468, the interactive media guidance application updates the favorite channel to refer to the corresponding channel in the second location. For example, the interactive media guidance application may update the favorite channel for WHBC 4 to WHDH 7.

One skilled in the art will appreciate that the invention can be practiced by other than the prescribed embodiments, which are presented for purposes of illustration and not of limitation, and the invention is limited only by the claims which follow.

What is claimed is:

1. A method for updating media settings using an interactive media guidance application implemented on mobile user equipment, the method comprising:
    determining, using processing circuitry of the mobile user equipment, that the mobile user equipment is in a first location;
    retrieving first media information corresponding to the first location;
    receiving a user request to set a function associated with a media program scheduled to be broadcast at a future time, wherein the first media information specifies a first source of the media program at the first location;
    storing data representing the user request on the mobile user equipment, wherein the data representing the user request includes an indication of the first source;
    after receiving the user request to set the function, determining, using the processing circuitry, that the mobile user equipment has moved from the first location to a second location, wherein the second location is associated with second media information that differs from the first media information; and
    in response to determining that the mobile user equipment has moved from the first location to a second location:
    automatically retrieving the second media information corresponding to the second location;
    automatically retrieving, from the mobile user equipment, media information associated with the first source based on the stored data representing the user request;
    automatically comparing the retrieved media information, associated with the first source, with each of a plurality of subsets of the second media information, each of the subsets corresponding to a different one of a plurality of sources;
    automatically identifying, based on the comparing, a second source of the plurality of sources for which the corresponding subset of the second media information matches the retrieved media information associated with the first source;
    automatically determining, based on the identifying, that the media program is scheduled to be broadcast by the second source at the second location; and
    automatically modifying the stored data to include an indication of the second source instead of the indication of the first source.

2. The method of claim 1, wherein determining, using the processing circuitry, that the mobile user equipment has moved from the first location to a second location comprises at least one of accessing a global positioning system, transmitting a signal to a network processor for performing network-based triangulation, and transmitting a signal to a network processor for performing radio-frequency multipath fingerprinting.

3. The method of claim 1, wherein determining, using the processing circuitry that the mobile user equipment has moved from the first location to the second location comprises determining the user's location at an interval.

4. The method of claim 1, wherein the user request to set the function associated with the media program scheduled to be broadcast at the future time comprises a user request to add the first source of the media program to a set of the user's favorite sources.

5. The method of claim 1, wherein the user request to set the function associated with the media program scheduled to be broadcast at the future time comprises a user request to set a reminder for the media program.

6. The method of claim 1, wherein the user request to set the function associated with the media program scheduled to be broadcast at the future time comprises a user request to remotely schedule a recording of the media program.

7. The method of claim 6, further comprising:
prompting the user to select a user equipment with which to record the media program.

8. The method of claim 1, wherein the first source and the second source are television channels.

9. The method of claim 1, further comprising:
receiving a plurality of service providers available in the second location;
determining whether the user has previously selected a service provider of the plurality of service providers;
in response to determining that the user has previously selected a service provider of the plurality of service providers, selecting the previously selected service provider to retrieve the second media information from.

10. The method of claim 9, further comprising, in response to determining that the user has not previously selected a service provider of the plurality of service providers:
prompting the user to select a service provider of the plurality of service providers.

11. A system for updating media settings using an interactive media guidance application implemented on mobile user equipment, the system comprising:
storage; and
control circuitry configured to:
determine that the mobile user equipment is in a first location;
retrieve first media information corresponding to the first location;
receive a user request to set a function associated with a media program scheduled to be broadcast at a future time, wherein the first media information specifies a first source of the media program at the first location;
store, in the storage, data representing the user request, wherein the data representing user request includes an indication of the first source;
after receiving the user request to set the function, determine that the mobile user equipment has moved from the first location to a second location, wherein the second location is associated with second media information that differs from the first media information; and
in response to determining that the mobile user equipment has moved from the first location to a second location:
automatically retrieve the second media information corresponding to the second location;
automatically retrieve, from the storage, media information associated with the first source based on the stored data representing the user request;
automatically compare the retrieved media information, associated with the first source, with each of a plurality of subsets of the second media information, each of the subsets corresponding to a different one of a plurality of sources;
automatically identify, based on the comparing, a second source of the plurality of sources for which the corresponding subset of the second media information matches the retrieved media information associated with the first source;
automatically determine, based on the identifying, that the media program is scheduled to be broadcast by the second source at the second location; and
automatically modify the stored data to include an indication of the second source instead of the indication of the first source.

12. The system of claim 11, wherein the control circuitry configured to determine that the mobile user equipment has moved from the first location to a second location is further configured to access a global positioning system, transmit a signal to a network processor for performing network-based triangulation, or transmit a signal to a network processor for performing radio-frequency multipath fingerprinting.

13. The system of claim 11, wherein the control circuitry configured to determine that the mobile user equipment has moved from the first location to the second location is further configured to determine the user's location at an interval.

14. The system of claim 11, wherein the user request to set the function associated with the media program scheduled to be broadcast at the future time comprises a user request to add the first source of the media program to a set of the user's favorite sources.

15. The system of claim 11, wherein the user request to set the function associated with the media program scheduled to be broadcast at the future time comprises a user request to set a reminder for the media program.

16. The system of claim 11, wherein the user request to set the function associated with the media program scheduled to be broadcast at the future time comprises a user request to remotely schedule a recording of the media program.

17. The system of claim 16, wherein the control circuitry is further configured to:
prompt the user to select a user equipment with which to record the media program.

18. The system of claim 11, wherein the first source and the second source are television channels.

19. The system of claim 11, wherein the control circuitry is further configured to:
receive a plurality of service providers available in the second location;
determine whether the user has previously selected a service provider of the plurality of service providers;
in response to determining that the user has previously selected a service provider of the plurality of service providers, select the previously selected service provider to retrieve the second media information from.

20. The system of claim 19, wherein the control circuitry, in response to determining that the user has not previously selected a service provider of the plurality of service providers is configured to:
prompt the user to select a service provider of the plurality of service providers.

* * * * *